United States Patent [19]

Cour et al.

[11] Patent Number: 4,670,873
[45] Date of Patent: Jun. 2, 1987

[54] SYSTEM FOR SETTING UP DATA TRANSMISSION CIRCUITS BETWEEN A PLURALITY OF STATIONS

[75] Inventors: Jean-Michel Cour, Orsay; Oliver Gibergues, Meudon, both of France

[73] Assignee: Gixi Ingenierie Informatique S.A., Les Ulis, France

[21] Appl. No.: 770,364

[22] Filed: Aug. 28, 1985

Related U.S. Application Data

[63] Continuation of Ser. No. 540,786, Oct. 11, 1983, abandoned.

[30] Foreign Application Priority Data

Oct. 15, 1982 [FR] France .................................. 82 17278

[51] Int. Cl.[4] ............................................. H04J 3/00
[52] U.S. Cl. ......................................... 370/86; 370/88
[58] Field of Search ........................ 370/88, 86, 26, 94, 370/29

[56] References Cited

U.S. PATENT DOCUMENTS

| | | | |
|---|---|---|---|
| 4,352,180 | 9/1982 | Schulze | 370/100 |
| 4,370,744 | 1/1983 | Hirano et al. | 370/16 |
| 4,445,213 | 4/1984 | Baugh et al. | 370/94 |
| 4,535,450 | 8/1985 | Tan | 370/88 |

FOREIGN PATENT DOCUMENTS

| | | |
|---|---|---|
| 0018938 | 11/1980 | European Pat. Off. . |
| 0028891 | 5/1981 | European Pat. Off. . |
| 57-38043 | 3/1982 | Japan . |
| 2028060 | 8/1978 | United Kingdom ................. 370/88 |

Primary Examiner—Douglas W. Olms
Assistant Examiner—Frank M. Scutch, III
Attorney, Agent, or Firm—Michael N. Meller

[57] ABSTRACT

A system for setting up circuits for the transmission of data with a constant data flow rate between a plurality of use equipment stations. A plurality of switching units are series-connected to form a loop by way of duplex point-to-point transmission connections. Each switching unit is connected to a corresponding use equipment station by way of at least a duplex transmission connection. A remote control receiving unit is incorporated in each switching unit for controlling the switching of data signals received by way of one of the transmission connections in response to predetermined control signals received. This switching function can be used to set up data circuits between any pair of use equipment stations.

5 Claims, 5 Drawing Figures

SYSTEM FOR SETTING UP DATA TRANSMISSION CIRCUITS BETWEEN A PLURALITY OF STATIONS

This application is a continuation of application Ser. No. 540,786, filed Oct. 11, 1983.

BACKGROUND OF THE INVENTION

The present invention relates to a system for setting up circuits for the transmission of data at a constant flow rate between a plurality of stations. It is more particularly applicable to the transmission of digital data between a plurality of stations.

The transmission of digital data has numerous well-known applications in such fields as information processing, the transfer of texts, sound (telephony) or pictures (digital video).

In this field, there are two types of transmission networks, which have different functional characteristics corresponding to contrasting requirement classes.

A first type of network is known in the art under the generic name "packet switching networks". In this first type of network, the data are grouped and transmitted in the form of relatively small packets or blocks, along paths which can vary in space and in time. This type of transmission characterizes exchanges between computer programs, which generally consist of brief messages, interrupted by variable delays.

A second type of network is known in the art under the generic name "circuit switching networks". In this second type of network, continuous connections with a constant flow rate are established between equipment. This type of connection characterizes systems where the flow must be guaranteed, e.g. digital telephones or image duplication systems.

Both types of networks exist or have been planned on the scale of large geographical regions, or on a planetary scale. Their overall interconnection constraints, as well as constraints linked with the long distances, lead to technical choices which will not be discussed in greater detail here, because they fall outside the preferred use range of the invention.

By their very nature, other networks have a limited range, e.g. for serving an apartment block, an industrial site, or a laboratory. In the case of such networks, the tendency is to use procedures specifically adapted to the limited distances between the use points. They are consequently frequently known under the generic name of "local networks".

The prior art discloses three categories of such local networks, each coinciding with certain specific uses. However, when confronted with certain communication needs and particularly when it is necessary to have very high data flow rates guaranteed over short periods, these known systems suffer from disadvantages, which are reduced or eliminated by the present invention, as will be shown hereinafter.

A first category of local networks is of the packet switching type. Generically, the networks of this category are based on the subdivision of a single transmission channel, or a limited number of such channels. In order to regulate this subdivision, use is also made of probabilistic processes, such as those known under the abbreviation CSMA-CD (Carrier Sense Multiple Access, Collision Detection), as well as deterministic processes, such as time division multiplexing, or the passage of a right to transmit by appropriate signals.

This first category of local networks has characteristics which are well adapted to the normal communications requirements between programs performed on several computers, so that several "logic connections" are set up in this way via a simplified infrastructure, with in certain cases auxiliary services in connection with the control of errors and/or flows. However, it is generally impossible to ensure between two connected stations, an effective data flow rate exceeding a minimum fraction of the flow of the transmission channels used. This is due to the interference, which is impossible to forecast, from other traffic with regards to the subdivision of the connection means. Moreover, the cost of the automatic management equipment for the channel subdivision process is high and increases with the transmission speed.

A second category of local networks is of the circuit switching type, most of them being oriented towards telephony, or are directly derived from methods linked with telephony. Generally such local networks comprise a central switching member, such as the private exchanges known under the abbreviation PABX, with the same number of direct point-to-point outgoing connections as there are stations served.

By definition, the local networks of the second category have optimized characteristics for the switching of circuits. However, their initial orientation towards telephony means that in mose cases there is a limitation in the data flow rate for each circuit. In the opposite case, the cumulative cost of providing the same number of high data flow rate for each circuit. In the opposite case, the cumulative cost of providing the same number of high data flow rate connections as there are stations becomes prohibitive, because the effective traffic is sporadic.

The prior art also discloses a third category of local networks, combining on a single split connection, or a small number of such connections, the advantages of data switching by packets and by circuits. For example, a train of cyclic signals is divided in time into a certain nubmer of "channels", whereof some are operated in the circuit mode and others by packets.

The systems of this third category are particularly advantageous if several simultaneous services such as telephony, data circuits, switching by packets, etc. are desired at each branch station. However, the management and supervision circuits are onerous for the transmission of data alone and it is not possible to simply allocate or reallocate more than part of a flow to a pair of given stations. Moreover, for most of these networks arranged in loop form, substantial transmission delays are systematically introduced, these delays being inherent in the register insertion mechanisms involved.

This generic examination of the prior art local network systems shows that there is a need for temporary communications with a high data flow rate.

SUMMARY OF THE INVENTION

More specifically, the present invention aims at obviating these disadvantages and to this end consists of a process for arranging a reduced number of high data flow rate connections, which can be subdivided by means of relatively inexpensive devices between a plurality of stations and which makes it possible to set up between two random stations, communications of the circuit type whose potential data flow rate is only limited by that of the connections.

The invention can be used in all systems involving a plurality of stations having a low average data flow rate, but which in transitorily manner require a guaranteed high data flow rate, such as in the transmission of digitized fixed images or the rapid remote loading of computer memories.

The present invention specifically relates to a system for setting up circuits for the transmission of data at a constant flow rate between a plurality of stations, comprising a group of duplex point-to-point transmission connections, switching units connected in loop form by said system of trasmission connections for transmitting data received from one connected switching unit to the corresponding user equipment station, to the other connected switching unit, or to said one connected switching unit and for transmitting data received from the corresponding user equipment station to either of the connected switching units, data transmission connections for connecting use equipment of said switching units provided for at least a duplex transmission, and remote control means for said switching units, for determining the switching of signals received from any one of the duplex transmission connections or connections to any one of these, thereby setting up data circuits between pairs of use apparatuses.

According to another feature of the invention, the switching units are grouped into multiple systems for the connection of mutually close use equipment, said multiple systems being provided with signal conversion means for the transmission and reception on connections adapted to the longest distances separating said multiple systems.

According to another feature of the invention, each switching unit also comprises encoding means for the transmission of a composite signal combining the data and clock pulses with a predetermined timing, decoding means for separating and regenerating the clock pulses and the data carried by said composite signal and encoding and decoding means inserted in the data signal paths for eliminating the cumulative deteriorations of the signals repeated by the switching units.

According to another feature of the invention, the system also comprises means for producing clock pulses connected to the remote control means, the data transmission speeds determined by the frequency of said clock pulses being chosen from a group of predetermined values.

According to another feature of the invention, the use apparatuses are also interconnected by an auxiliary communications network, in an arrangement and according to rules provided for the dynamic setting up, by remote control, of data circuits between the use apparatuses of the system.

BRIEF DESCRIPTION OF THE DRAWINGS

The invention is described in greater detail hereinafter relative to non-limitative embodiments and with reference to the attached drawings, wherein.

DETAILED DESCRIPTION OF THE INVENTION

Figure 1:
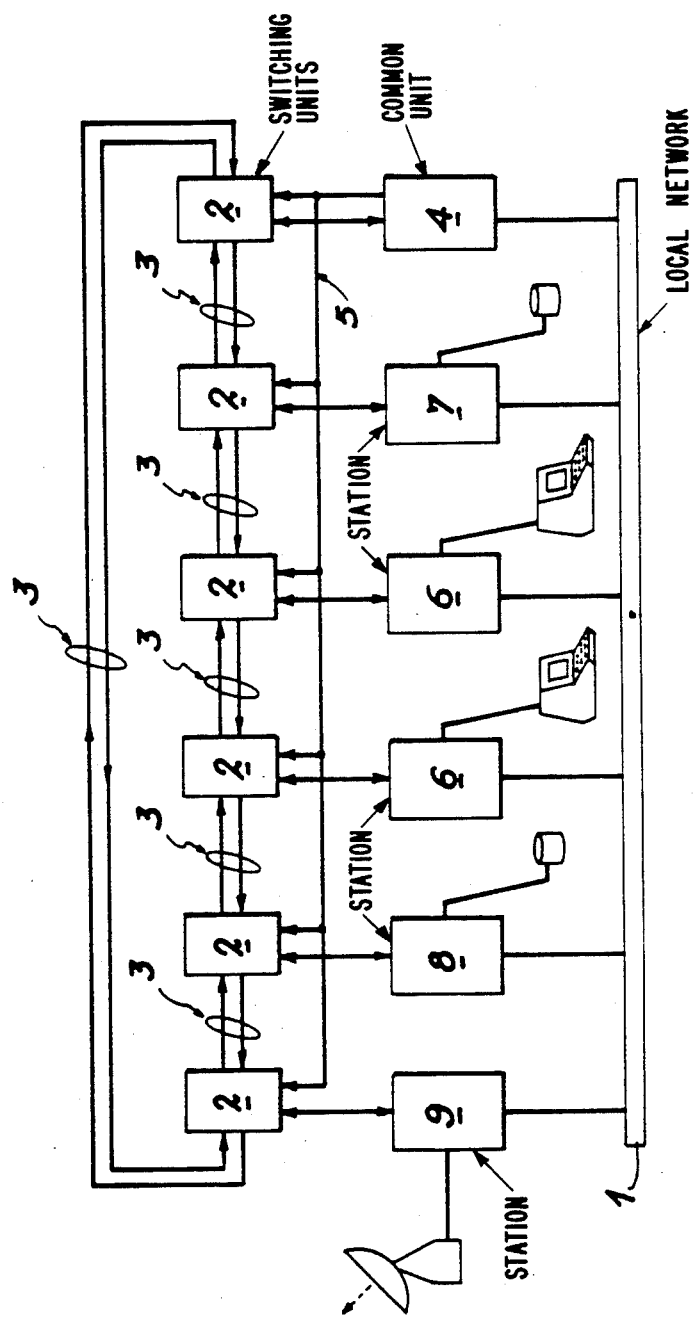
FIG. 1 diagrammatically depicts a device according to the invention which interconnects general use computers and interface and image processing equipment.

FIG. 1 diagrammatically shows a system of interconnections between general use computers and image processing and interface equipment, in which the device according to the invention is used. This network comprises a known local network 1 ensuring a service of switching by packets between the stations, said local network 1 not forming part of the invention. It is assumed that the local network 1 also connects the computers and equipment to the public packet switching networks via switching units 2 which serve to shunt and/or echo recived signals.

The stations are connected to the transmission system according to the invention. This system comprises high data flow rate duplex connections 3, the switching units 2 and connections 3 being arranged in loop form according to the invention. The switching units 2 are remotely controlled by a common unit 4, via any known type of remote control transmission connection.

Stations 6 are working stations respectively constituted by a computer, particularly equipped with an image restoration screen and a keyboard.

Station 7 is a storage computer, more particularly equipped with high-capacity disk memories, managed by a data-based management software. Station 8 is a computer specialized in image processing having appropriate hardware and software means. Station 9 is an interface apparatus with a satellite data transmission network.

The hypothetical system shown in FIG. 1 processes, for example, fixed images resulting from physical experiments, planetary observations by aircraft and/or satellite, or medical observations and in general terms this system processes digitized images.

All the information processed by this system is consequently constituted by images or pictures coded in digital form. These images are manipulated in the form of sequential files, for which orders of magnitude are given in millions of bits by stations of types 6, 7 or 8.

The local packet switching network 1 is used for the transmission between stations 6, 7, 8 of system control and monitoring information for operations such as data interrogation, the initiating of tasks or synchronization. This first transmission service is established in a permanent manner.

The system according to the invention is constituted by switching units 2 and duplex connections 3 which are used as relays for the transmission of images, via the interface apparatus 9, between the system and an external network by satellite. This latter service is only available in a temporary manner and at the request of user stations.

When a first station of type 6, 7 or 8 wishes to transmit an image or picture in the form of a file to or from a second station of type 6, 7, 8 or 9, these two stations negotiate the parameters for this transfer by the interrogation of the local network 1. Then one or other of the two stations transmits to the common unit 4, via local network 1, a request for setting up a circuit between them. This request includes exchange parameters, such as the addresses of the two stations, the volume of the file and reference codes of the request.

The common unit 4 updates a waiting line or queue of transmission requests and proceeds in the following manner to satisfy the request at the head of the queue, via remote control connection 5:

the switching unit of the first station is positioned for setting up a circuit in one direction of the loop, the switching unit of the second station is positioned for setting up a circuit in the opposite direction, optionally, the switching units on the thus defined loop portion are positioned so as to repeat the circuits in both directions and in a transparent manner.

The common unit 4 then informs the two stations in question, via network 1, that the circuit has been established between them, by indicating the reference code of the granted request, in order that the two stations can identify the request being dealt with from among those requests which could have been jointly made. From this instant, the stations in question have access, for a limited time period, to a high data flow rate, transparent duplex circuit.

In addition, the common unit 4 calculates the maximum time necessary for the exchange, as a function of the indicated data volume or other parameters. At the end of this time, the common unit 4 informs them, via network 1, that the circuit is no longer available.

Whilst such a circuit is established, the common unit 4 seeks in the queue a request which may possibly be satisfied by only using the switching units located on the unused loop portion. If such a request exists, it is granted by the same basic mechanism.

The aforementioned allocation method is not the only one available according to the invention and another form will be described hereinafter.

In this variant, the communications requests are transmitted to the common unit 4, with information for defining the address of the transmitting station, the address of the destination station, a priority value and the reference code of the request. The requests are granted as a function of the priority value of each request.

By means of the local network 1, the common unit 4 notifies the stations in question that their request has been granted. The station which has made the request normally notifies the common unit 4, via local network 1, when the transmission has been completed. For security purposes, the common unit 4 monitors a maximum delay or time lag, as in the first method, and in any case notifies the stations in question that the communication is at an end when this time has expired.

Apart from the normal operating mechanisms, such a system has security means, particularly with respect to duplex connections 3 and switching units 2.

Thus, for example, two stations which have obtained a circuit from common unit 4, can recognize the impossibility of transmitting by this circuit if such is the case. Common unit 4 is informed thereof via local network 1 and a test is carried out by examining the successive sections (a section is a connection between two switching units).

In order to carry this out via the remote control connection 5, the common unit brings about a looping of the first switching unit 2 with respect to common unit 4 (in one direction) i.e. the switching unit transmits (i.e. echoes) in the opposite direction the signals received from the common unit.

If this test is successful, the common unit remotely controls the looping of the following switching unit in the same direction, whilst establishing the transparency of the preceding switching unit. Thus, step by step, it is possible to investigate the switching units to determine which switching units does not transmit the signals correctly. By a step-by-step test in the opposite direction, the fault is even better located and, except in the case of a simultaneous fault, a given section is recognized as being non-operational.

Apart from the information to the maintainance services, the common unit 4 can have its own correcting action by not using the defective section for setting up circuits. All the communications which are then possible are established via those portions of the loop excluding this defective section. It should also be noted that the maintainance operations (precise diagnosis and repair) normally only affect the defective section and the service of setting up circuits is maintained in only a slightly reduced form.

Figure 2:
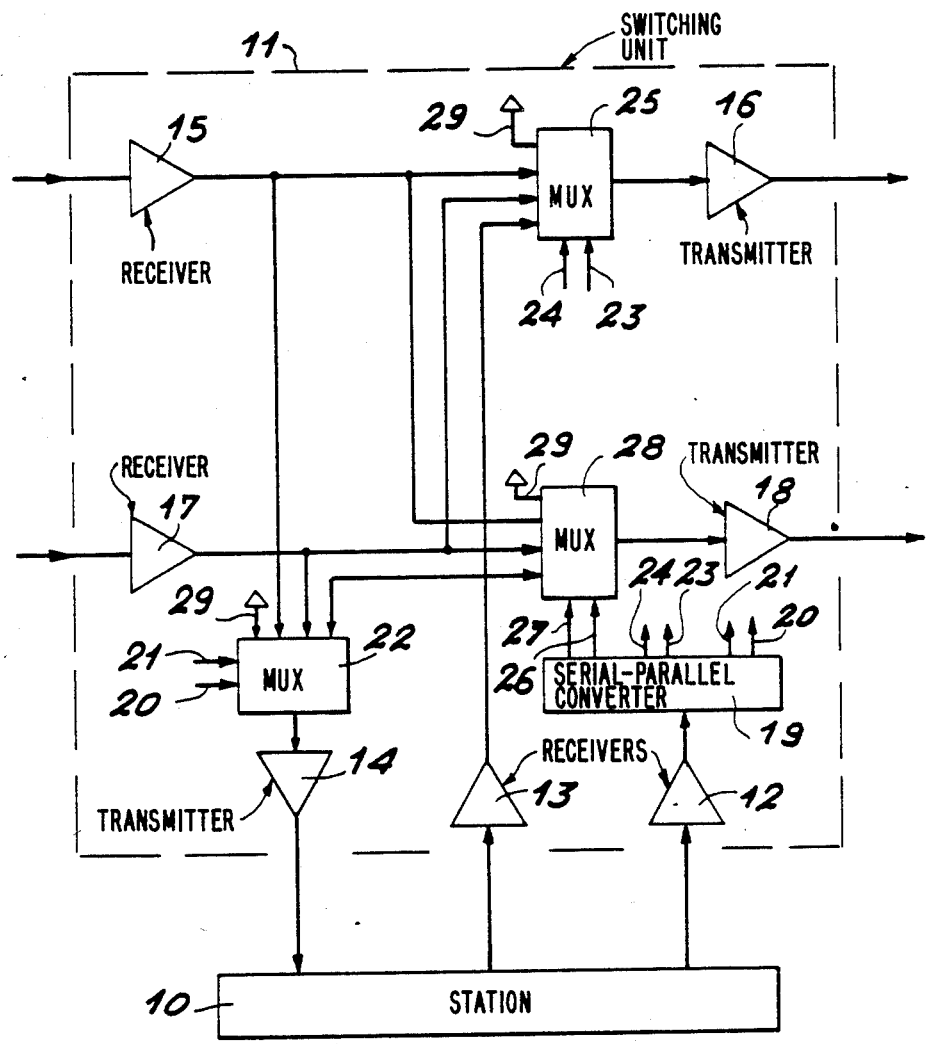
FIG. 2 diagrammatically depicts a simplified embodiment of a switching unit of the device according to the invention.
Figure 3:
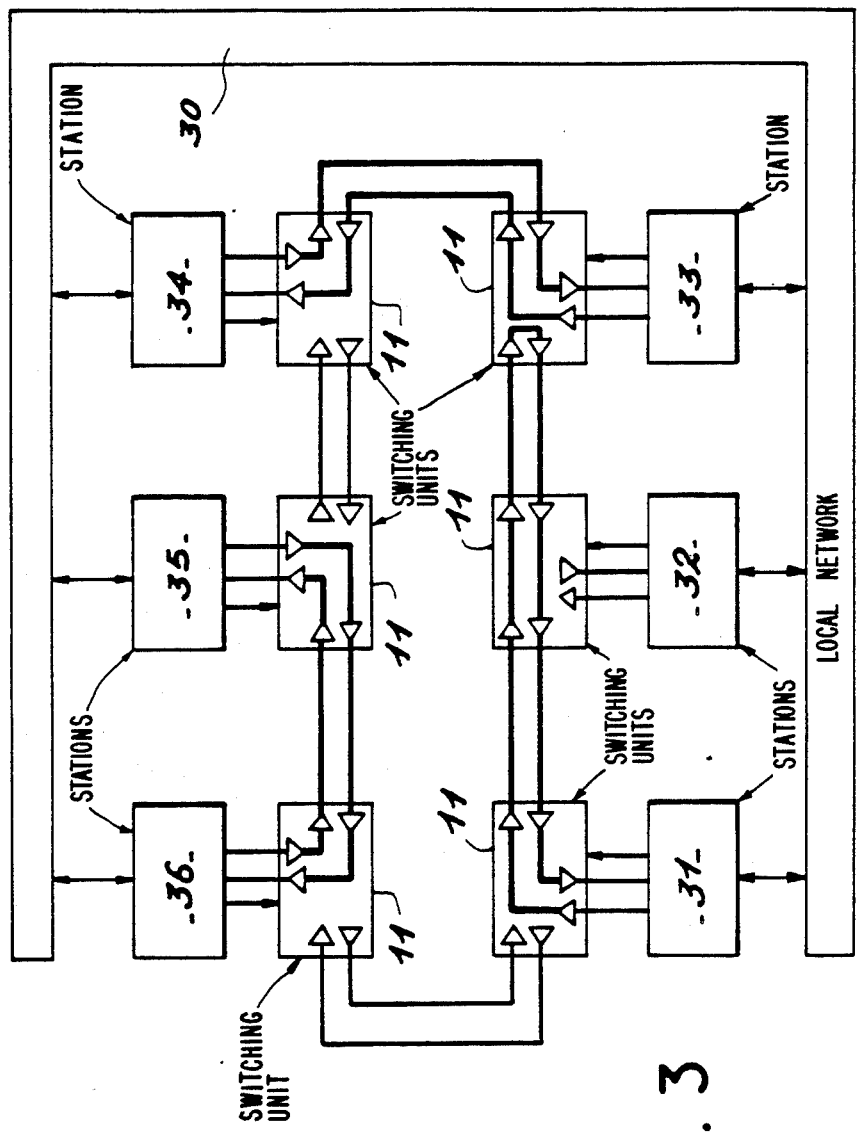
FIG. 3 diagrammatically depicts a system of stations interconnected via switching unit like that depicted in FIG. 2, with the data circuitry depicted for the purpose of illustrating certain characteristics of the invention.

A simplified realization of the is described relative to FIG. 2, whilst FIG. 3 shows stations interconnected via switching units according to the invention. The preferred embodiment of the invention will then be described. The initial description serves to provide a better understanding of the generic nature of the means used in the invention and the different stages of their operation.

FIG. 2 shows a station 10 connected to the switching unit 11 by means of a remote control connection with a line receiver 12, a connection for transmitting data to a receiver 13 and a data reception connection integral with a transmission circuit 14. These different connections and circuits are of the "series transmission type".

The switching unit 11 is also connected to two identical switching units (not shown) by duplex series transmission connections. One of these connections consists of a line connected to a receiver 15 and a line connected to transmitter 16. The other connection is a line connected to a receiver 17 and a line connected to the transmitter 18. The principle of the overall arrangement of connections between switching units is given hereinafter in FIG. 3.

The remote control of the switching unit is ensured by a series-parallel conversion circuit 19 from which emanate:

two connections 20, 21 for determining one data path from among four across a multiplexer 22, two connections 23, 24 serving the same function as connections 20, 21, but relative to a multiplexer 25, two connections 26, 27 serving the same function relative to a multiplexer 28.

At the inputs thereof and in the same logic order, these multiplexers receive:

a standard signal from source 29, such as a fixed polarization determining a predetermined rest state, the signals received via receiver 15, the signals received via receiver 17, the signals received via receiver 13.

It is clear that this arrangement makes it possible to exclusively connect a given signal source (receiver or standard source) to a given transmission connection (transmitter) under the direct control of the remote control connection. It is also clear that this differentiator can be constructed on the basis of a small number of standard elements, which illustrates the basic simplicity and the low costs resulting from the invention.

FIG. 3 shows a local network 30, which interconnects a group of stations 31–36, also connected to switching units 11, the latter being connection in a loop-like manner in accordance with a characteristic arrangement. The point-to-point connections between transmitters 16 and receivers 17, on the one hand, and transmitters 18 and receivers 15 (see FIG. 2), on the other hand, are shown in opposite directions, in such a way that two oppositely directed connecting loops are obtained.

In order not to overburden FIG. 3, the details of the internal interconnections of switching units 11 are not shown. However, the data paths established in an exemplary manner are shown in dark line form. The local network 30 is of a known type and carries messages determining the remote controls actuating switching units 11.

On the switching unit 11 integral with station 31 are established the signal paths
13 to 18
17 to 14
via the multiplexers shown in FIG. 2.

In the same way, on the switching unit associated with station 32:
15 to 18
17 to 16 (cf. FIG. 2).
On the switching unit associated with station 33:
15 to 16
13 to 18
17 to 14 (cf. FIG. 2).
On the switching unit associated with station 34:
13 to 16
15 to 14 (cf. FIG. 2).
On the switching unit associated with station 35:
17 to 14
13 to 18 (cf. FIG. 2).
On the switching unit associated with station 36:
13 to 16
15 to 14 (cf. FIG. 2).

The processes which have determined this configuration of signal paths are beyond the scope of the invention. However, it is an important feature of the invention that it is possible to simultaneously establish by very simple generic means:
a data station relooped on circuit 31, via the switching unit associated with station 32 used as a repeater, and by transmission-reception looping in the switching unit associated with station 33,
two integral duplex data circuits between stations 33, 34, on the one hand, and stations 35, 36, on the other hand.

FIG. 3 also shows another important feature of the invention, namely that the data circuits are a prior set up independently of classes of flow, codes or formats of messages, which can differ from circuit to circuit, or in each transmission direction. The maximum speed of the connection is available for each simultaneously established circuit.

It is also obvious that, using the same generic means, it is possible to set up both simplex circuits and duplex circuits, for example, for a high data flow rate transmission in one direction only, whilst the "releases" will circulate at a low data flow rate, via the auxiliary local network.

The only limitations are of a technological nature and essentially connected with the types of transmitting or receiving circuits, the physical connections and/or the cumulative effects which are liable to deteriorate the signals passing through too many successive connections. Finally, advantage is taken of a well known property in the state of the art, which is inherent in such loop arrangements. It is possible to establish a duplex circuit in two different ways, i.e. by two physically separate parts, which obviously serves to enhance operating security.

However, the known loop systems all differ from that according to the invention, because they do not provide for the establishment, by a separate remote control, of temporary, bidirectional data circuits with a variable data flow rate and standard usage, i.e. for interconnecting two random stations.

The already described simplified construction can have a number of limitations of a known nature, which limitations are inherent in the defects of data transmission connections. Thus, the signals are invariably deteriorated by various phenomena, such as attenuation, background noise, interference, time base variations, etc. Traversing, without reshaping, of successive connection chains (and transmitter/receivers) tends to cumulate errors, such as phase displacements, to a point where the original signal can no longer be restored.

To obviate these disadvantages, use is made in the prior art of coding processes based on transmission clocks having a predetermined timing in a predetermined tolerance. These coding processes, such as those known as bi-phase or Manchester, introduce into the line transitions of the signal at a timing determined by such a clock. In the case of a system generically known by the name "phase locking loop", on the basis of the signal received and a local clock with the same timing as the transmission clock, a clock and a data signal conforming with those of the transmitter are regenerated.

It is then possible either to repeat this regenerated.

It is then possible either to repeat this regeneration signal in a new connection, or to supply "healthy" data to the element in question.

For the high data flow rate envisaged by the invention, the preferred performance mode is based on this type of process for ensuring the limited transmission of data signals, via an prior arbitrary number of switching unit, whilst retaining variable data flow rates and data transparency.

Moreover, in the preferred embodiment, account must be taken of a possible dispersion of the distances between switching unit, in order to obtain a significant economic advantage. Thus, in practice some of the stations of a system can naturally be grouped in the immediate vicinity of others, such as the terminals of an operating room, whilst the overall system has several more remote sites, such as several buildings or workshops.

Figure 4:
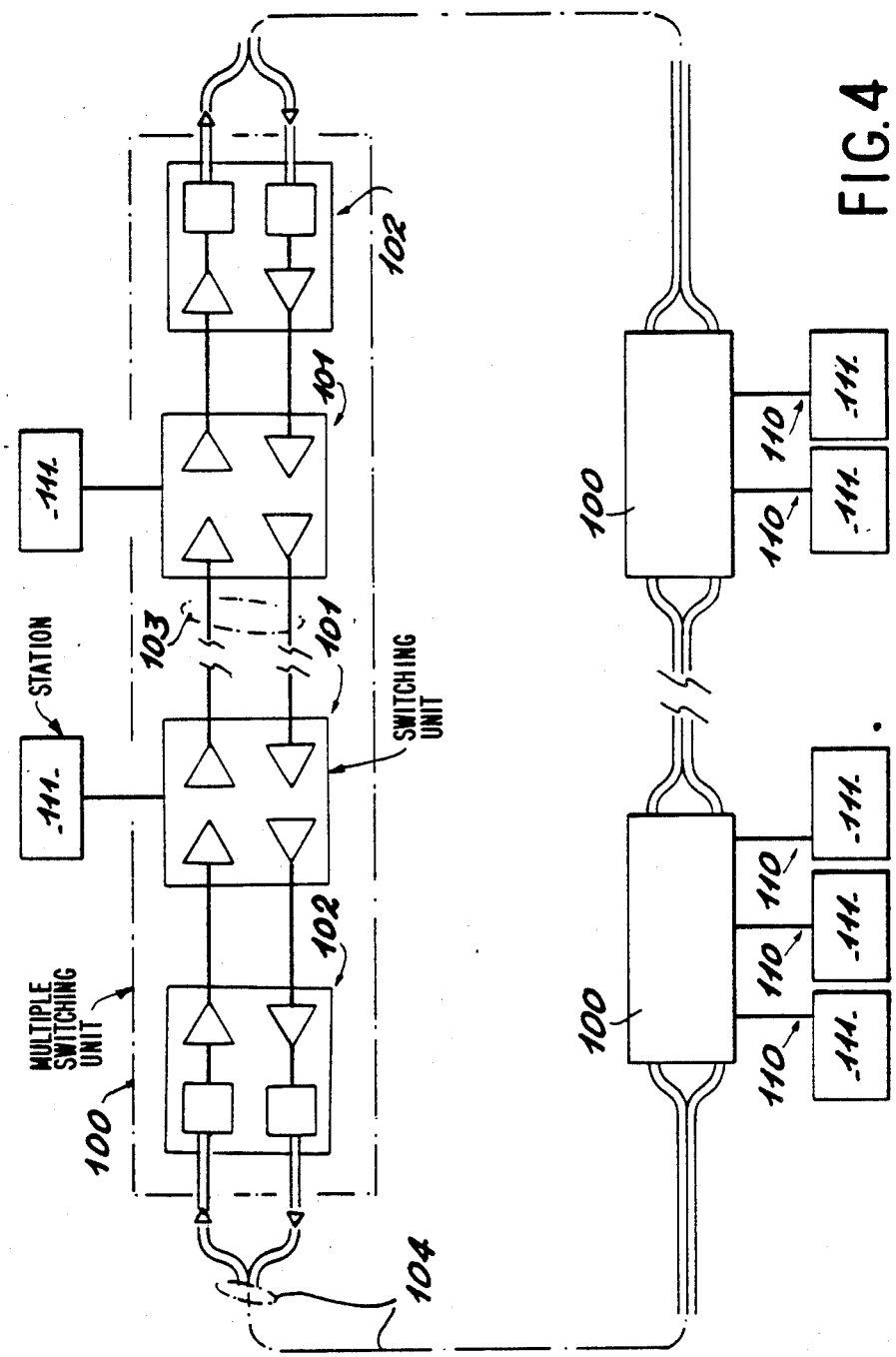
FIG. 4 diagrammatically depicts, according to a preferred embodiment, the arrangement of switching modules and a unit grouping several switching units.

FIG. 4 shows a group of multiple switching unit arrays 100 arranged according to the invention and interconnected in loop form. Each array 100 is constituted by a group of switching units 101, whose structure and operation are very similar to the description given hereinbefore of the simplified arrangement, and two conversion modules (converters) 102 for long-distance transmission.

The transmission connections 103 within the switching units 101 are very short and are advantageously ensured by inexpensive known processes, such as simple "logic" connections at levels known under the abbreviation TTL, or differential electrical connection.

Only the transmission connections 104 between switching unit arrays have a significant length and must be chosen in accordance with the desired performances. They are, for example, duplex-operated double optical fiber connections. The only function of converters 102 is to ensure the conversion of internal signals into signals in accordance with the long-distance transmission mode and vice versa. The use connection 110 connects the switching unit 101 to the use apparatus 111.

The advantage of the preferred arrangement is that it makes use of the geographical grouping of stations, in such a way that a group of stations which are sufficiently close to one another is connected to a common switching unit array. where the grouped switching units communicate by short, inexpensive connections. The more expensive connections, which are necessary for long distances, such as optical connections, are limited in number because they only interconnect groups of stations. Thus, according to the arrangement of the invention, there is a homogeneous transmission quality and at the same time the number of costly components is reduced.

The practical realization of the conversion modules 102 only requires the use of known means and will not be described in greater detail. For example, it can use an optical transmitter - receiver pair, marketed by Hewlett-Packard, e.g. under the respective references HBFR 1001 and HBFR 1002 (1501 Page Mill Road, Palo Alto, Ca. 94304, U.S.A.).

Figure 5:
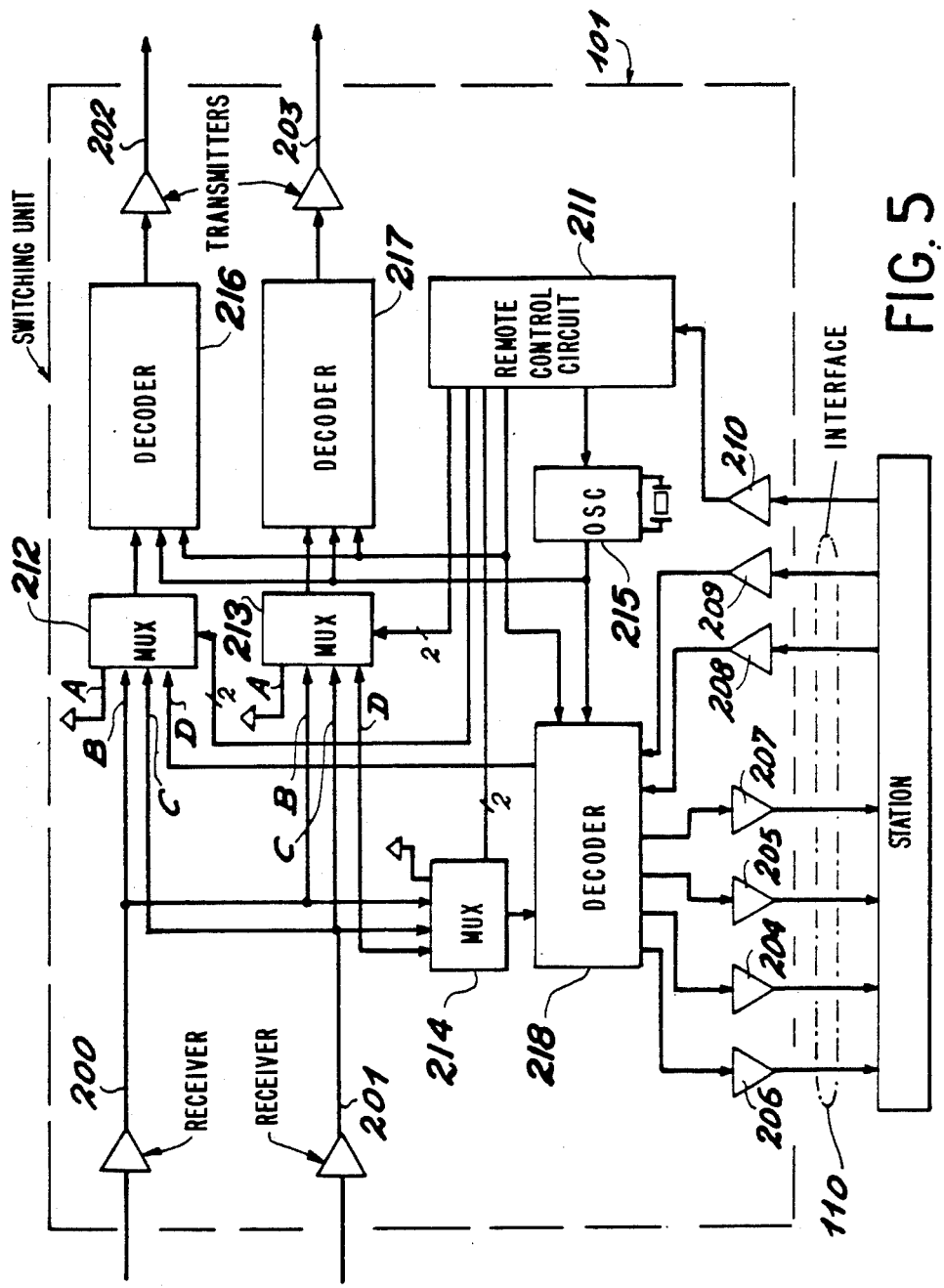
FIG. 5 is a detailed circuit diagram of the actual differentiator.

FIG. 5 shows a preferred construction of the switching unit 101, as well as details of the interface 110, across which the user station is connected.

For insertion in the loop, switching unit 101 has two receiving circuits 200, 201 and two transmitting circuits 202, 203, of the type in accordance with the conventional TTL logic levels.

The interface 110 (cf. also FIG. 4) comprises a predetermined number of two-wire lines, operating in the differential mode, and the transmission/reception circuits are chosen in accordance with standards, such as the CCITT notice V11. These lines consist of:

a series data reception line via transmitting circuit 204 and the connected clock line via transmitter 205, completed by the data quality signal received across transmitter 206;

a clock line for the transmission of data via transmitter 207, said data being transmitted via the receiving circuit 208, and the patterns of said data, identified by the synchronization signal transmitted via receiver 209;

the final series connection, received via receiver 210, is connected to the remote control circuit 211.

From the remote control circuit 211 emanate:

six control lines connected in pairs to multiplexers 212, 213, 214;

a control line, which selects one of two clearly defined frequencies of an oscillator 215 which, in turn, supplies reference clock pulses to the encoding/decoding circuits 216, 217 and 218, which are of type HD-6409, marketed under the name Matra-Harris Semiconductors;

a common line controlling the integrated clock divider (not shown) of said encoders/decoders.

The encoder/decoder circuits have two operating modes defined by a polarity previously displayed on a control input.

According to a first, permanently selected operating mode for circuit 218, the circuit supplies at the output of transmitter 207 transmission clock pulses. The data signals output by the user apparatus are encoded in accordance with a bi-phase process, known in the art under the name Manchester II, and are presented at the inputs "D" of the three multiplexers 212, 213, 214. Symmetrically, an encoded signal of the same nature is received via multiplexer 214 and is decoded in clock pulses and data, presented via transmitters 205, 204 respectively. Pulses received via receiver 208 then bring about the transmission of a characteristic resynchronization sequence inherent in said bi-phase process. Symmetrically, a possible loss of synchronism (i.e. data) is indicated by the decoder via transmitter 206. This synchronism is precisely stored by the reception of the desired sequence, caused by the switching unit of the corresponding user, via its own circuit 208.

According to a second operating mode, which is fixed for circuits 216, 217, the encoders/decoders have a repeater function, due to an integrated phase locking loop, said circuits respectively providing transmitters 202, 203 with a regenerated, encoded, series signal in which are eliminated the small phase disturbances due to the upstream transmission line.

The operations of the switching unit 101 are essentially the same as those of switching unit 11, which has been described for the simplified variant of the invention, with respect to the establishment of the transmission, reception, and data repetition paths.

The specificity of the switching unit of the preferred embodiment appears in the regeneration of signals ensured by means of a bi-phase coding of predetermined timing, as well as by the addition of a time base 215 sensitive to the remote control and which permits the establishment of synchronous data circuits in a predetermined range of speeds.

It is obvious that the presently described switching unit can be further simplified to act permanently as a repeater.

It should be noted that the switching unit 101 can be constructed with the aid of only ten conventional integrated circuits and that in so-called very high integration technology, it represents a functional block which can be integrated into a single circuit with certain power considerations (regarding the transmission lines).

What is claimed is:

1. A system for setting up circuits for the transmission of data with a constant data flow rate between a plurality of use equipment stations, comprising a plurality of switching units connected to form a loop, each pair of adjacent switching units being connected by duplex point-to-point transmission connections, each of said switching units being connected to a corresponding one of said plurality of use equipment stations by way of at least a duplex transmission connection, and each of said switching units comprising a remote control receiving means for controlling the switching of data signals received by way of one of said transmission connections in response to predetermined control signals received, whereby a data circuit can be set up between a pair of use equipment stations such that data is exchanged between said pair of stations by way of the respective duplex transmission connections which connect two of said switching units to said pair of stations and by way of a part of said loop connecting said two switching units, wherein each of said switching units comprises a first encoding means operatively connected to transmit composite signals combining clock pulses and data with a predetermined timing to said corresponding use equipment station, and a second decoding means operatively connected to separate and regenerate clock pulses and data from composite signals received from said corresponding use equipment station.

2. The data transmission system according to claim 1, wherein each of said switching units further comprises second and third encoding and decoding means inserted in the different data signal flow paths for eliminating the cumulative deteriorations of those signals repeated by each of said switching units.

3. The data transmission system according to claim 1, wherein each of said plurality of switching units comprises receiving means, transmitting means, and multiplexing means, said multiplexing means being controlled by said remote control receiving means such that each of said switching units is able to transmit data received from one connected switching unit to said corresponding use equipment station, to the other connected switching unit, or to said one connected switching unit, or to transmit data received from said corresponding use equipment station to either of said connected switching units in accordance with control signals received by said remote control receiving means.

4. A system for setting up circuits for the transmission of data with a constant data flow rate between a plurality of use equipment stations, comprising a plurality of switching units connected to form a loop, each pair of adjacent switching units being connected by duplex point-to-point transmission connections, each of said switching units being connected to a corresponding one of said plurality of use equipment stations by way of at least a duplex transmission connection, and each of said switching units comprising a remote control receiving means for controlling the switching of data signals received by way of one of said transmission connections in response to predetermined control signals received, whereby a data circuit can be set up between a pair of use equipment stations such that data is exchanged between said pair of stations by way of the respective duplex transmission connections which connect two of said switching units to said pair of stations and by way of a part of said loop connecting said two switching units, wherein each of said switching units further comprises clocking means for producing clock pulses, said clocking means being connected to said remote control receiving means such that the data transmission speed of each of said switching units is determined by the frequency of the clock pulses generated by the corresponding clocking means, said frequency being selected from a group of predetermined values.

5. The data transmission system according to claim 1, wherein said use equipment stations are connected to each other and to a common control unit by way of an auxiliary communications network, whereby requests to transmit to a destination station are sent to said common control unit by said use equipment stations by way of said auxiliary communications network, said requests being accompanied by priority values which are used by said common control unit to allocate the granting of requests.

* * * * *